(12) United States Patent
Gabriel (10) Patent No.: US 11,079,031 B2
(45) Date of Patent: Aug. 3, 2021

(54) VALVE CAGE WITH LATTICE STRUCTURE

(71) Applicant: FISHER CONTROLS INTERNATIONAL LLC, Marshalltown, IA (US)

(72) Inventor: Thomas N. Gabriel, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 167 days.

(21) Appl. No.: 15/982,684

(22) Filed: May 17, 2018

(65) Prior Publication Data
US 2019/0353265 A1   Nov. 21, 2019

(51) Int. Cl.
| F16K 27/00 | (2006.01) |
| F16K 3/24 | (2006.01) |
| F16K 3/26 | (2006.01) |
| F16K 3/316 | (2006.01) |
| F16K 3/34 | (2006.01) |

(52) U.S. Cl.
CPC .............. *F16K 27/00* (2013.01); *F16K 3/246* (2013.01); *F16K 3/267* (2013.01); *F16K 3/316* (2013.01); *F16K 3/34* (2013.01); *Y10T 137/86734* (2015.04); *Y10T 137/86791* (2015.04)

(58) Field of Classification Search
CPC .......... F16K 27/00; F16K 3/246; F16K 47/08; F16K 27/02; F16K 27/0272; F16K 3/267; F16K 3/316; F16K 3/34; B33Y 80/00; B33Y 30/00; Y10T 137/86791; Y10T 137/86734; Y10T 137/86718

USPC .............. 251/366, 127; 138/42; 137/625.28, 137/625.3, 625.37
See application file for complete search history.

(56) References Cited

U.S. PATENT DOCUMENTS

| 3,513,864 A | * | 5/1970 | Self ........................ F16K 47/08 137/14 |
| 3,954,124 A |  | 5/1976 | Self |
| 4,249,574 A | * | 2/1981 | Schnall .................... F15C 1/02 137/625.3 |
| 4,429,714 A | * | 2/1984 | Hughes ................... F16K 47/08 137/625.3 |
| 4,456,033 A | * | 6/1984 | Kay ........................ F16K 47/08 137/14 |
| 4,617,963 A |  | 10/1986 | Stares |
| 4,860,993 A | * | 8/1989 | Goode .................... F16K 47/08 251/127 |

(Continued)

OTHER PUBLICATIONS

International Search Report and Written Opinion for PCT/US2019/032198, dated Aug. 14, 2019.

*Primary Examiner* — John Bastianelli
(74) *Attorney, Agent, or Firm* — Marshall, Gerstein & Borun LLP (57) ABSTRACT

A valve cage of a control valve includes a cylindrical body having a first ring, a second ring opposite the first ring, an outer wall, an inner wall, and an interior portion that extends radially between the inner wall and the outer wall and extends axially between the first ring and the second ring. A passage extends through the outer and inner walls of the cylindrical body, and is disposed between the first ring and the second ring of the cylindrical body. A three-dimensional lattice structure is disposed in the interior portion of the cylindrical body.

20 Claims, 6 Drawing Sheets

(56) References Cited

U.S. PATENT DOCUMENTS

| | | | | |
|---|---|---|---|---|
| 7,802,592 | B2* | 9/2010 | McCarty | F16K 47/08 |
| | | | | 138/42 |
| 2005/0104023 | A1* | 5/2005 | Morton | F16K 47/08 |
| | | | | 251/206 |
| 2009/0179169 | A1* | 7/2009 | Fleming | F16K 47/08 |
| | | | | 251/186 |
| 2016/0341335 | A1* | 11/2016 | Adams | F16K 47/08 |
| 2017/0102076 | A1 | 4/2017 | Reynolds et al. | |
| 2017/0102089 | A1* | 4/2017 | Griffin, Jr. | B33Y 30/00 |
| 2017/0184086 | A1* | 6/2017 | Scancarello | F04B 39/0284 |
| 2018/0003318 | A1 | 1/2018 | Adams et al. | |
| 2018/0112800 | A1 | 4/2018 | Griffin, Jr. et al. | |

\* cited by examiner

VALVE CAGE WITH LATTICE STRUCTURE

FIELD OF DISCLOSURE

The present disclosure generally relates to a valve assembly and, in particular, to a valve cage of a valve assembly.

BACKGROUND

In typical fluid regulators and control valves, a valve cage may provide guidance for a control element as the control element moves from a closed position, in which the control element engages a valve seat, to an open position, in which the control element is disposed away from the valve seat. In the open position, fluid may flow from a valve inlet, through a passage between the valve seat and the control element, through the valve cage, and exit through a valve outlet. In addition to guiding the control element, a valve cage can be used for additional flow control functions, such as controlling and/or otherwise influencing flow and the volume of fluid flow as the control element moves between the closed position to the open position.

SUMMARY

In accordance with a first exemplary aspect, a valve assembly may include a valve body defining an inlet, an outlet, and a fluid flow path connecting the inlet and the outlet. A valve seat may be positioned in the fluid flow path between the inlet and the outlet, and a valve stem may be disposed in the valve body. A control element may be operatively connected to the valve stem and may be disposed in the fluid flow path. The control element may be movable between a closed position, in which the control element engages the valve seat, and an open position, in which the control element is spaced away from the valve seat. A valve cage may be disposed in the valve body adjacent the valve seat. The valve cage may include a cylindrical body having an outer wall and an inner wall that is sized to receive the valve element. The cylindrical body may include a first ring, a second ring opposite the first ring, and an interior portion that extends radially between the inner wall and the outer wall and extends axially between the first ring and the second ring. A passage may extend through the outer and inner walls of the cylindrical body and the passage may be disposed between the first ring and the second ring of the cylindrical body. A three-dimensional lattice structure may be disposed in the interior portion of the cylindrical body. The three-dimensional lattice structure may be fluidly isolated from the fluid flow path.

In accordance with a second exemplary aspect, a valve cage for a control valve ay include a cylindrical body including a first ring, a second ring opposite the first ring, an outer wall, an inner wall, and an interior portion that extends radially between the inner wall and the outer wall and extends axially between the first ring and the second ring. The cylindrical body may be arranged to be positioned between an inlet and an outlet of a valve body and arranged to receive a control element. A passage may extend through the outer and inner walls of the cylindrical body and may be disposed between the first ring and the second ring of the cylindrical body. A three-dimensional lattice structure may be disposed in the interior portion of the cylindrical body.

In accordance with a third exemplary aspect, a method of manufacturing a body of a valve cage using additive manufacturing may include forming a cylindrical body having a first ring, a second ring opposite the first ring, an outer wall, an inner wall arranged to receive a valve element, and an interior portion extending radially between the inner wall and the outer wall and extending longitudinally between the first ring and the second ring. The method may include forming a passage disposed between the first ring and the second ring and extending through the inner and outer walls of the cylindrical body. Further, the method may include forming a three-dimensional lattice structure and disposing the three-dimensional lattice structure in the interior portion of the cylindrical body.

In further accordance with any one or more of the foregoing first, second, or third aspects, a valve assembly, a valve cage, and/or a method of manufacturing a valve cage may further include any one or more of the following preferred forms.

In a preferred form, the three-dimensional lattice structure may extend around the inner wall of the cylindrical body.

In a preferred form, the passage may include a first area proximally located to the first ring and a second area proximally located to the second ring. The three-dimensional lattice structure may be disposed in the interior portion adjacent to at least one of the first area of the passage.

In a preferred form, the valve assembly may include a second passage extending through the interior portion of the cylindrical body. The second passage may be disposed between the first ring and the second ring and may be spaced circumferentially relative to the passage. The three-dimensional lattice structure may be disposed between the passage and the second passage.

In a preferred form, the three-dimensional lattice structure may extend between an inside surface of the inner wall and an inside surface of the outer wall.

In a preferred form, the three-dimensional lattice structure may extend at an angle between the inside surface of the inner wall and the inside surface of the outer wall.

In a preferred form, the passage may include a first area proximally located to the first ring and a second area proximally located to the second ring. The three-dimensional lattice structure may be disposed in the interior portion adjacent to the first area of the passage.

In a preferred form, the first area may be defined by first and second non-parallel walls, and the three-dimensional lattice structure may be disposed between the first ring and at least one of the first and second non-parallel walls.

In a preferred form, the first and second non-parallel walls may be angled such that a width of the first area of the passage is defined between the first and second non-parallel walls and the width of the passage may decrease in an axial direction.

In a preferred form, the three-dimensional lattice structure may have a cross-sectional area that tapers from at least one of the first and second non-parallel walls toward the first ring of the cylindrical body.

In a preferred form, the three-dimensional lattice structure may include a first outer edge and a second outer edge. The first edge may be disposed on a reference plane substantially parallel to the first ring of the cylindrical body and a portion of the second outer edge may be non-parallel to the first edge.

In a preferred form, the second edge may have a first portion parallel to the first edge and a second portion non-parallel to the first edge. The second portion of the second edge may be disposed above the first area of the passage.

In a preferred form, forming the three-dimensional lattice structure may include depositing a solidifiable material within the interior portion in at least one of a first area proximate to the first ring and a second area proximate to the second ring.

In a preferred form, the method may include establishing a stress threshold of the cylindrical body and determining a localized area of the cylindrical body that falls below the stress threshold. Forming the three-dimensional lattice structure may include depositing a solidifiable material in the localized area.

In a preferred form, the method may include establishing a flow profile of the passage and determining a shape of the passage to achieve the flow profile. Forming the passage may include depositing a solidifiable material in multiple layers to form the shape of the passage.

In a preferred form, the method may include forming a channel extending from the inner wall of the cylindrical body to the interior portion of the cylindrical body, and may include funneling loose solidifiable material disposed in the interior portion of the cylindrical body through the channel.

In a preferred form, forming the passage may include depositing a solidifiable material in consecutive layers to form first and second side walls defining the passage and arranging the solidifiable material so that a width of the passage defined between the first and second side walls decreases in an axial direction.

In a preferred form, forming the cylindrical body may include forming the cylindrical body and the three-dimensional lattice structure together by depositing a solidifiable material in multiple layers according to a predetermined pattern to form a three-dimensional integrated cage.

DETAILED DESCRIPTION

The present disclosure is generally directed to a control valve having a valve cage and a method of manufacturing the valve cage with a reduced weight. The valve cage of the examples described and illustrated herein may be manufactured by one or more techniques of Additive Manufacturing (AM).

Figure 1:
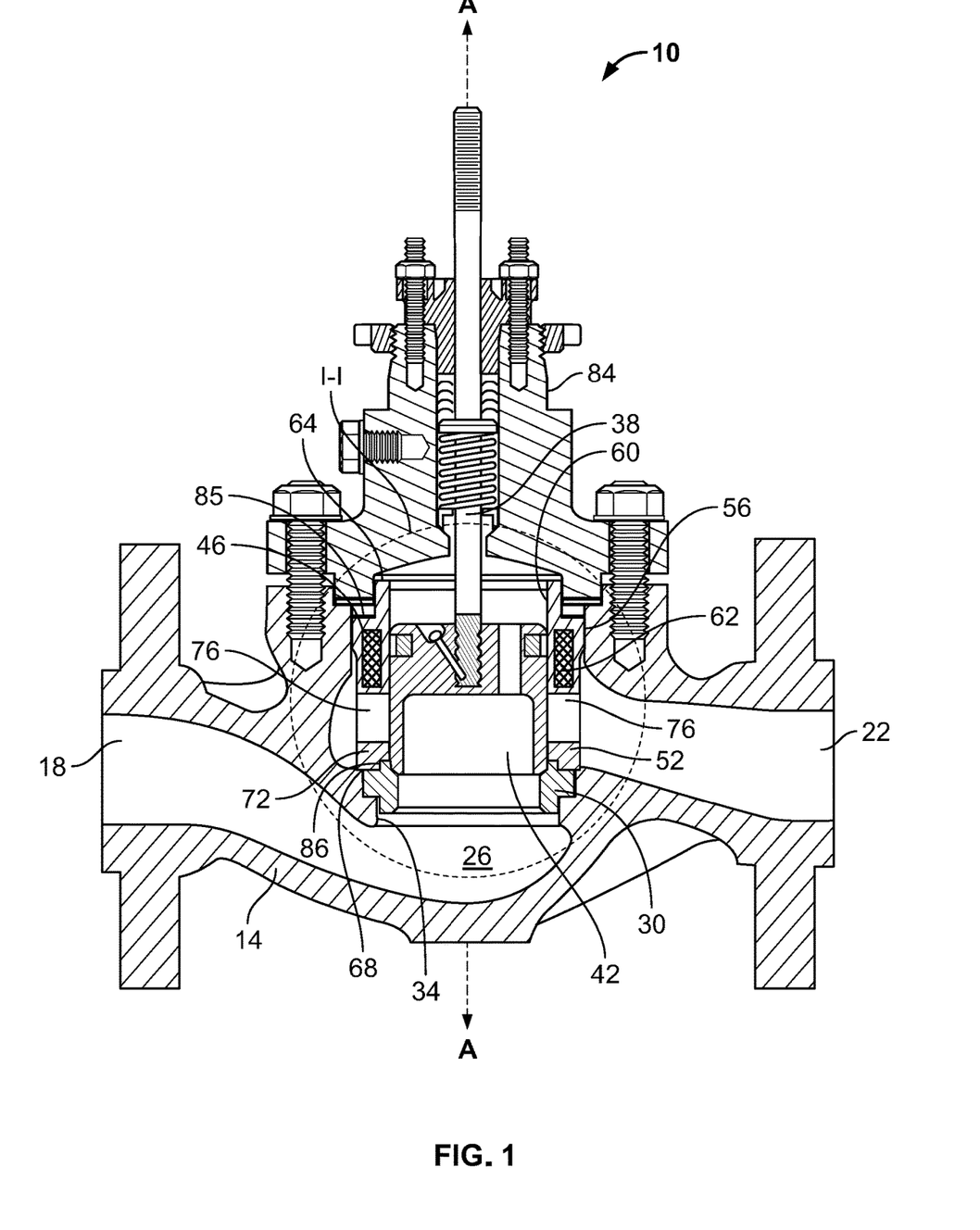
FIG. 1 is a cross-sectional view of a control valve assembly including a valve cage assembled in accordance with the teachings of a first exemplary arrangement of the present disclosure.
Figure 2:
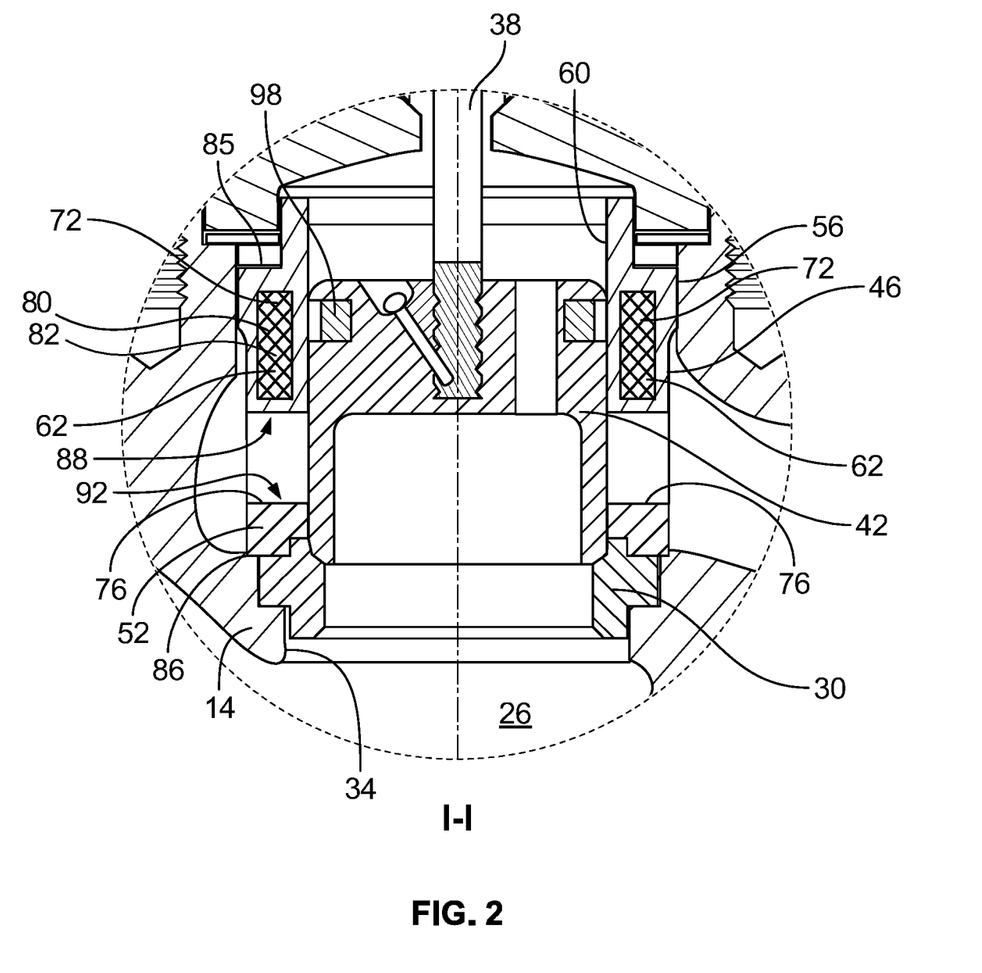
FIG. 2 is a magnified view of section I-I of the control valve assembly of FIG. 1.

In FIGS. 1 and 2, a valve assembly 10 is constructed according to the teachings of the present disclosure. The valve assembly 10 includes a valve body 14 defining an inlet 18, an outlet 22, and a fluid flow path 26 connecting the inlet 18 and the outlet 22. A valve seat 30 (e.g., a seat ring) is positioned adjacent an orifice 34 of the body 14 and in the fluid flow path 26. A valve stem 38 is disposed in the valve body 14 and is operatively connected to a control element 42 (e.g., a valve plug). The control element 42 is disposed in the fluid flow path 26 and is movable between a closed position, in which the control element 42 engages the valve seat 30 as shown in FIGS. 1 and 2, and an open position, in which the control element 42 is spaced away from the valve seat 30. The valve assembly 10 includes a valve cage 46 that is disposed in the valve body 14 and adjacent the valve seat 30. The cage 46 includes a cylindrical body 52 having an outer wall 56 and an inner wall 60 that is sized to slidably receive the valve element 42. A three-dimensional lattice structure 62 is disposed between the outer and inner walls 56, 60 of the cylindrical body 52 and is fluidly isolated from a surrounding cage environment (i.e., a process media).

The cylindrical body 52 of the cage includes a first ring 64, a second ring 68 disposed opposite from the first ring, and an interior portion 72. The interior portion 72 of the cylindrical body 52 extends radially between the outer wall 56 and the inner wall 60 of the cylindrical body 52, and extends axially between the first ring 64 and the second ring 68. The interior portion 72 contains the three-dimensional lattice structure 62 and may include hollow areas and/or solid areas. Between the first and second rings 64, 68, a passage 76 extends through the interior portion 72 of the cylindrical body 52 to permit fluid flow through the cage 46. In the illustrated example, the first and second rings 64, 68 of the cylindrical body 52 are integrally formed with the outer and inner walls 56, 60 of the cage 46. However, in another example, the valve cage 46 may be composed of separately constructed components that are securely attached and/or formed at separate stages of manufacturing.

The three-dimensional lattice structure 62 is disposed in the interior portion 72 of the cylindrical body 52, and is structured to provide a porous interior (i.e., not completely solid) to reduce weight of the cage 46 without compromising the integrity of the cage 46. The lattice structure 62 includes a plurality of horizontal and vertical structural elements 80 that form a plurality of square-shaped openings 82 in a pattern. The plurality of structural elements 80 may be separate elements, or the elements may be joined together (or formed together) to make an integral structure having a lattice pattern 82. In other examples, the lattice structure 62 may include a plurality of structural elements 80 that are diagonal, horizontal, and/or vertical to create diamond, triangular, or other polygonal openings. In yet another example, the structural elements 80 may be round to form circular, elliptical, or spherical openings 82. In another example, the lattice structure 62 is a gyroid-type lattice structure. The gyroid lattice structure 62 may be constantly changing, and may be arranged to have variations in unit cell size (e.g., diameter of an opening 82) and in lattice volume fraction. For example, a cross-sectional area of a lattice cell unit may have a 3*mm* diameter and a volume fraction of 15 percent (%). A 15% volume fraction refers to the total volume designated as the lattice structure such that only 15% of the mass is used to form the lattice. The volume fraction is based on the thickness of the lattice structural elements or struts 80. For example, thicker lattice structural elements 80 increase the volume fraction of the lattice structure 62.

As shown in FIG. 1, the first ring 64 of the cage 46 abuts a bonnet 84 fastened to the valve body 14, and the second ring 68 of the cage 46 engages the valve seat 30 to secure the seat 30 at least partially within the orifice 34 of the valve body 14. In this particular example, the first ring 64 partially defines an annular stepped portion 85 or ledge recessed radially inward from a circumference of the outer wall 56 of the cylindrical body 52. A bonnet seal may be disposed between the ledge 85 of the first ring 64 and the bonnet 84. At the opposing end of the cage 46, the second ring 68 partially defines a stepped portion or ledge 86 that engages the seat 30 to secure the seat 30 at least partially within the orifice 34 of the valve body 14. In another example, the cage 46 described herein may be mounted to a valve body 14 in a manner different from the arrangement illustrated in FIG. 1.

As more clearly shown in FIG. 2, the three-dimensional lattice structure 62 of the illustrated example is disposed within the interior portion 72 of cylindrical body 52 between the passage 76 and the bonnet 84. The passage 76 includes a first area 88 proximate to the first ring 64, and a second area 92 proximate the second ring 68 of the cylindrical body 52. As shown in FIGS. 1 and 2, the three-dimensional lattice structure 62 is disposed adjacent to the first area 88 of the passage 76 and is sealed off from process media (e.g., liquid, gas) flowing through the valve assembly 10. In fact, in the illustrated example the lattice structure 62 extends around the inner wall 60 and within the interior portion 72 of the cylindrical body 52. The valve cage 46 includes a second passage 76 substantially similar to the first passage 76, and the lattice structure 62 is disposed adjacent to a first area 88 of the second passage as well. In other examples, the cage 46 may have more than two passages 76 circumferentially arranged relative to a longitudinal axis A of the cylindrical body 52. The lattice structure 62 in this example may be disposed adjacent to the first area 88 of one or more of the plurality of passages 76 and may extend fully or partially around the inner wall 60 of the cylindrical body 52. It will be appreciated that any details of one passage 76 of the cage 46 discussed herein apply equally to the second or more passages 76.

The control valve 10 may be operatively coupled to an actuator (not shown) that is configured to move the stem 38 and therefore the control element 42 in an axial direction relative to the longitudinal axis A relative to the cage 46. In operation, the cage 46 cooperates with the control element 42 to control fluid flow through the fluid flow path 26 of the valve assembly 10. The control element 42 moves in sealing engagement with the inner wall 60 of the cage 46 when the stem 38 slides between open and closed positions. In the illustrated example, a plug seal 98 is disposed between the inner wall 60 of the cage 46 and the control element 42 to ensure the downstream process media does not leak past the control element 42. As the control element 42 slides out of engagement with the valve seat 30, the inlet 18 and the outlet 22 are fluidly connected such that fluid may flow from the inlet 18, through the orifice 34 of the valve body 14, through the second ring 68 of the cylindrical body 52, and through one or more passages 76 of the valve cage 46 toward the outlet 22. The arrangement of the passages 76 of the valve cage 46 may configured to affect the flow of fluid through the cage 46. For example, the cage 46 may be constructed to provide an equal percentage, linear, or a quick-opening cage by altering the shape, size, and placement of the passages relative to the orifice 34 and control element 42. In another example, the inner wall 60 of the cage 46 may include a groove to guide the control element 42 between the open and closed positions.

Figure 3:
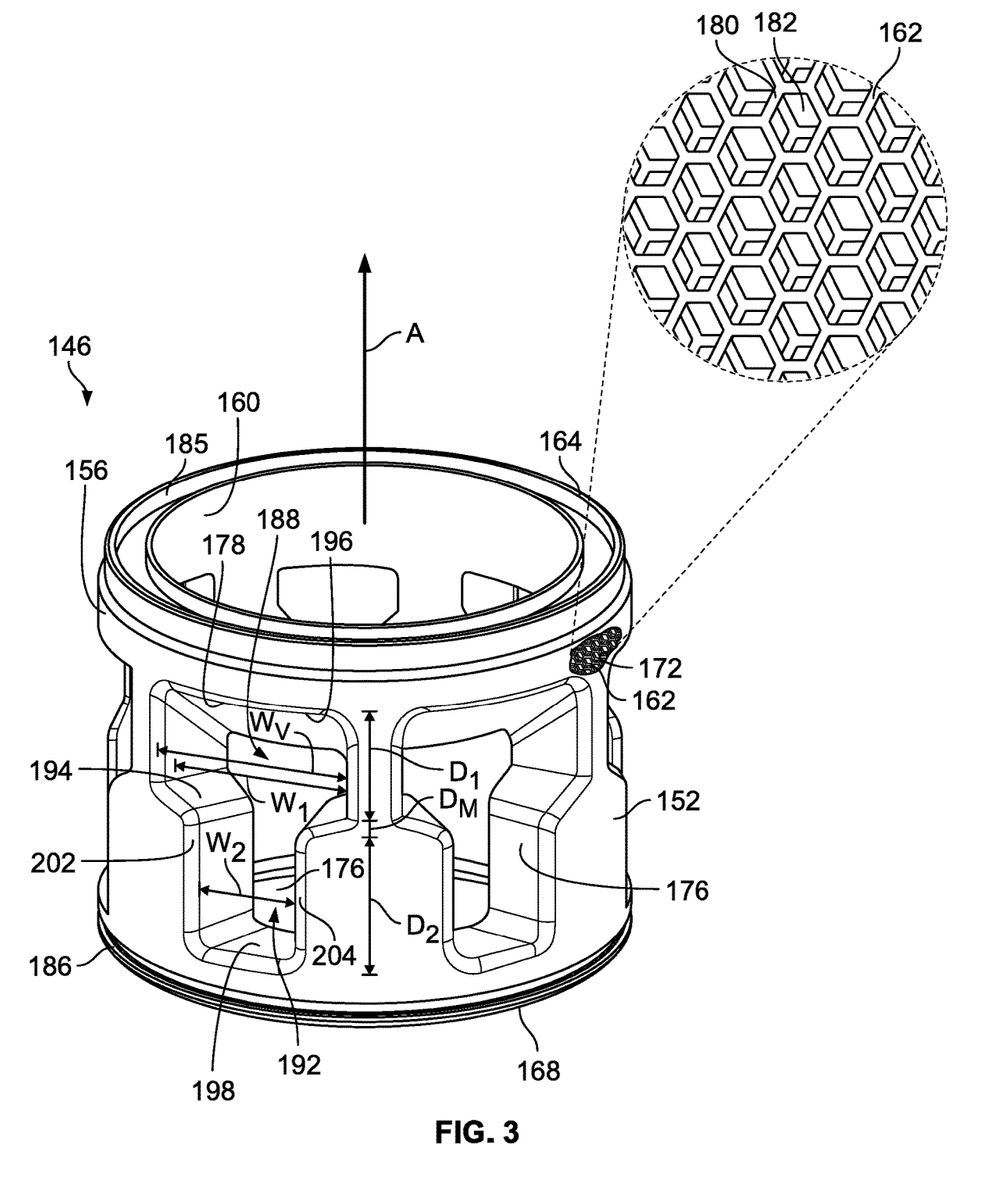
FIG. 3 is a perspective view of a valve cage assembled in accordance with the teachings of a second exemplary arrangement of the present disclosure and showing a partial cutaway of the valve cage.

Turning now to FIG. 3, a second exemplary valve cage 146 is constructed according to the teachings of the present disclosure. The second exemplary cage 146 is similar to the cage 46 of FIGS. 1 and 2, and includes a cylindrical body 152 having an outer wall 156 and an inner wall 160. The second exemplary cage 146 may be installed in the valve body 14 of the control valve 10 of FIG. 1. Thus, for ease of reference, and to the extent possible, the same or similar components of the second exemplary cage 146 will retain the same reference numbers as outlined above with respect to the first exemplary cage 46, although the reference numbers will be increased by 100. However, the second exemplary valve cage 146 differs from the first exemplary valve cage 46 in the manner discussed below.

In FIG. 3, a three-dimensional lattice structure 162 is sealed from the surrounding cage environment and is disposed between the outer wall 156 and the inner wall 160 of the cylindrical body 152. The lattice structure 162 may be formed with the cylindrical body 152, or the lattice structure 162 may be formed separately and then later disposed in an interior portion 172 and attached to the cylindrical body 152 at the outer or inner walls 156, 160. In the illustrated example, the lattice structure 162 extends around an inner circumference of the inner wall 160 of the cage 146 above a first area 188 of a plurality of passages 176. In particular, the three-dimensional lattice structure 162 extends between an inside surface (not shown) of the inner wall 160 and an inside surface of the outer wall 156 adjacent to the first area 188 of the plurality of passages 176. The lattice structure 162 may have a simplified structure to correspond to the shape of the first area 188 of the passages 176 and is formed by a plurality of connected structural elements 180 that form a pattern of openings 182. In some examples, the lattice structure 162 may be joined to the inside surfaces of the outer and inner walls 156, 160 of the cylindrical body 152 with a radius or fillet. The radius may help reduce stress between the lattice structure 162 and the inside surfaces of the outer and inner walls 156, 160 of the cylindrical body 152.

Each of the plurality of passages 176 has a generally T-shaped opening 178, which is defined by the first area 188, a second area 192, and a middle portion 194 connecting the first and second areas 188, 192. The three-dimensional lattice structure 162 is adjacent to the T-shaped opening 178, and in particular, adjacent to the first area 188 of the passage 176 proximate to the first ring 164 of the cylindrical body 152. The first area 188, the second area 192, and the middle portion 194 are defined by first and second end walls 196, 198 and first and second side walls 202, 204. A width $W_V$ of the passage 176, which is defined between the first and second side walls 202, 204, changes (i.e., decreases and increases) in the axial direction relative to the longitudinal axis A such that the width $W_V$ of the passage 176 is largest at the first area 188 and smallest at the second area 192. More specifically, a first area width $W_1$ of the passage 176 remains substantially constant as the first and second side walls 202, 204 are parallel or substantially parallel over a distance $D_1$ of the passage 176. The width $W_V$ of the passage 176 decreases from the first area width $W_1$ to a second area width $W_2$ as the first and second side walls 202, 204 extend inwardly at an angle over a distance $D_M$. The width $W_2$ remains constant or substantially constant as the first and second side walls 202, 204 are parallel or substantially parallel over a distance $D_2$. While the width $W_V$ is greatest adjacent the first end wall 196 of the passage 176, other cage examples may provide passages having a linear, curved, or staggered change in width $W_V$ along a length of the passage 176. Additionally, while the width $W_V$ of the passage 176 changes abruptly at the middle portion 194 of the passage 176, the width $W_V$ of the passage 176 of other valve cages may change gradually or randomly to achieve a particular passage opening and/or flow profile. It will be appreciated that a width $W_V$ of the passage 176 may vary relative to the opening 178 at the outer wall 156 and at the inner wall 160. For example, the first end wall 196 is illustrated as a sloped wall such that the width $W_V$ of the passaged 176 formed in the outer wall 156 is greater than the width $W_V$ formed in the inner wall 160. As such, the opening 178 of the passage 176 formed in the inner wall 156 is greater than the opening 178 of the passage 176 formed in the inner wall 160. As used herein, the width $W_V$ of the passage 176 may generally relate to the width $W_V$ across the passage, either from the outer wall 156 or the inner wall 160.

The second exemplary valve cage 146 is configured for installation within the valve body 14 of the valve assembly 10 to affect the flow of a process media through the valve. In particular, the second exemplary valve cage 146 is constructed to permit a smaller initial fluid flow to pass through passages 176 of the cage 146 as a control element 42 moves away from a closed position. In other words, the changing width $W_V$ of the passage 176 between the first and second side walls 202, 204 allows greater fluid flow through the passage 176 as the control element 42 moves away from the valve seat 30. For example, as the control element 42 moves away from the seat 30 (e.g., moves in an upward direction of FIG. 3), a greater portion of the passages 176 opens, thereby increasing the area of the opening 178 to permit fluid flow through the valve body 14. When the control element 42 is positioned a distance $D_2$ from the closed configuration, the second area 192 of the passage 176 is open to permit fluid flow through the second area 192. As the control element 42 moves a farther distance $D_M$ away from the seat 30, the width $W_V$ of the passage 176 increases and the middle portion 194 of the passage 176 is open to permit fluid flow through the second area 192 and the middle portion 194. Finally, as the control element 42 moves a distance $D_1$ farther away from the seat 30, the first area 188 of the passage 176 is open to permit fluid flow through the entire opening 178 of the passage 176. It will be appreciated that any details of one passage 176 of the cage 146 discussed herein apply equally to the second or more passages 176 of the cage 146.

Figure 4:
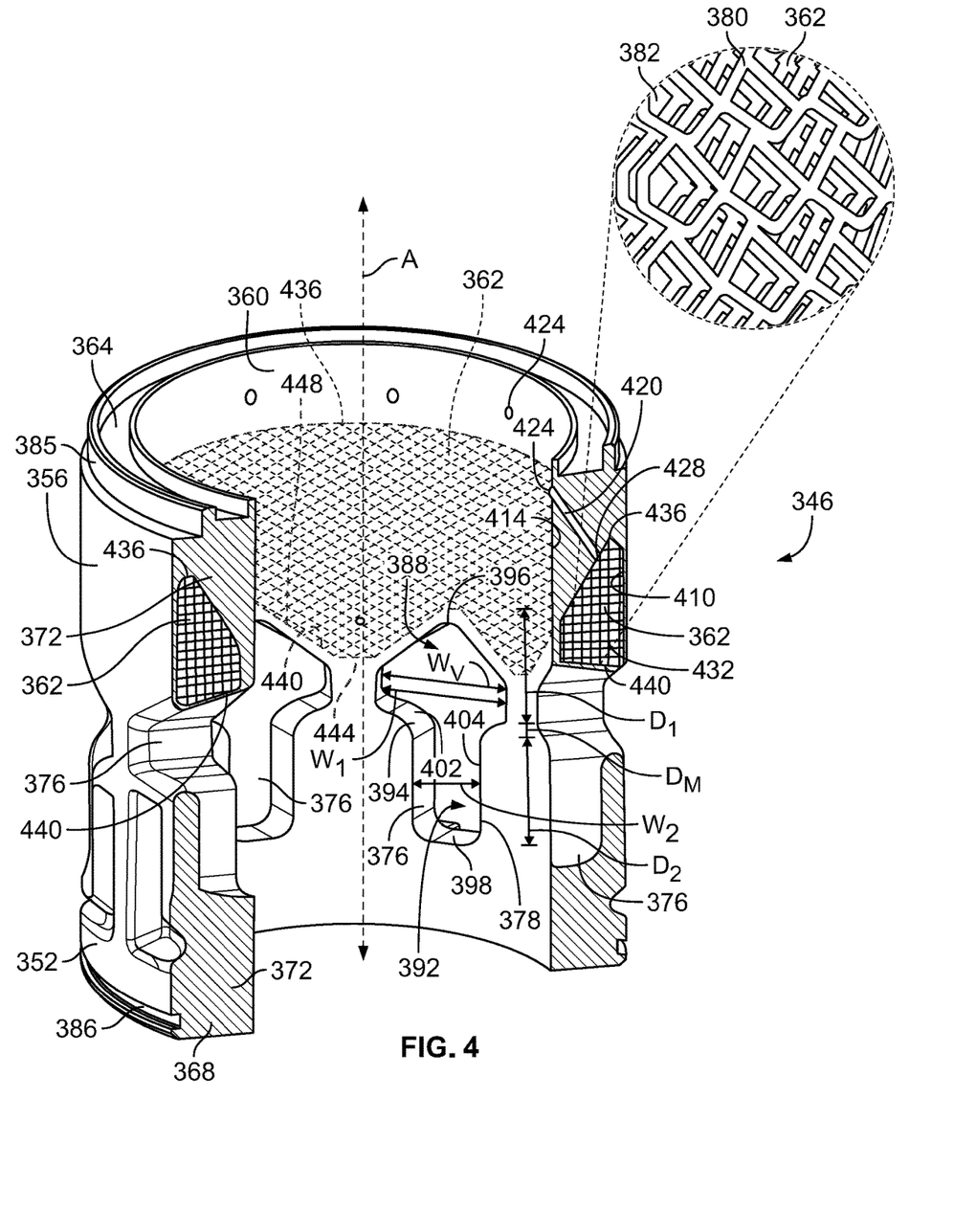
FIG. 4 is a cross-sectional perspective view of a valve cage assembled in accordance with the teachings of a third exemplary arrangement of the present disclosure and showing a partial cutaway of the valve cage.

Turning now to FIG. 4, a third exemplary valve cage 346 is constructed according to the teachings of the present disclosure. The third exemplary cage 346 is similar to the second exemplary cage 146 of FIG. 3, and includes a cylindrical body 352 having an outer wall 356 and an inner wall 360. A plurality of passages 376 are circumferentially and evenly spaced about the cylindrical body 352 of the cage 346 and extend through an interior portion 372 of the cylindrical body 352. Similar to the second exemplary cage 146, the third exemplary cage 346 may be installed in the valve body 14 of the control valve assembly 10 of FIG. 1. Thus, for ease of reference, and to the extent possible, the same or similar components of the third exemplary cage 346 will retain the same reference numbers as outlined above with respect to the second exemplary cage 146, although the reference numbers will be increased by 200.

As shown in FIG. 4, a three-dimensional lattice structure 362 is sealed from the surrounding cage environment and is disposed between the outer wall 356 and the inner wall 360 of the cylindrical body 352. The lattice structure 362 extends around the inner wall 360 of the cage 346, above (relatively in FIG. 4) a first area 388 of a plurality of passages 376, and between the first areas 388 of the plurality of passages 376. In particular, the three-dimensional lattice structure 362 extends between an inside surface 410 of the outer wall 356 and an inside surface 414 of the inner wall 360. The lattice structure 162 may be formed directly on, or attached to, one or both of the outer and inner walls 356, 360. A plurality of channels 420 extend partially through the cylindrical body 352 to connect the interior portion 372 with the inner wall 360 of the cylindrical body 352. The plurality of channels 420 are angled such that a first end 424 of the channel 420 extends through the inside surface 414 of the inner wall 360 and a second end 428 is adjacent to the three-dimensional lattice structure 362 disposed within the interior portion 372. These channels 420 help reduce waste created during the manufacturing process. For example, and as will be discussed below, the three-dimensional lattice structure 362 may be formed by depositing layers of solidifiable powder within the interior portion 372 of the cylindrical body 352, and melting or sintering the solidifiable powder within the interior portion 372 to form a layer of the lattice pattern 382. During this process, excess and unused solidifiable powder material that has not been sintered or melted to form part of the lattice structure 362 may accumulate within the interior portion 372 of the cylindrical body 352. Periodically throughout or after the process, the unused powder may be funneled out of the interior portion 372 of the cylindrical body 352 through the channels 420 for reuse or disposal. After manufacturing the cage 346, the channels 420 may be sealed (e.g., plugged, welded, or plug welded) such that process media cannot seep into the first end 424 of the channels 420 and into the interior portion 372 of the cage 346. While the illustrated valve cage 346 provides a lattice structure 362 that may be fluidly isolated from the process media, another example valve cage 346 may include a lattice structure 362 formed on one or more outside surfaces of the outer wall 356, the inner wall 360, and/or within the opening 378 of the passage 376 to provide a fluid flow path extending through or partially though the valve cage 346.

The third exemplary valve cage 346 of FIG. 4 differs from the second exemplary valve cage 146 of FIG. 3. As shown in the magnified portion of the lattice structure 362 in FIG. 4, a plurality of lattice members 380 are arranged and connected to form a pattern of polygonal shaped openings 382 different from the lattice structure 162 of FIG. 3. Additionally, the passages 376 of FIG. 4 are shaped to provide a different flow profile for the flow of a process media. In particular, the passages 376 have arrow-shaped openings 378. Thus, because the three-dimensional lattice structure 362 corresponds to the triangular shape of the passage openings 378, the lattice structure 362 may have a more complex lattice formation than the lattice structure 162 of the second exemplary cage 146. In other examples, the arrangement of the passages 376, and therefore the formation of the lattice structure 362, may be constructed to have varying degrees of complexity due variations in its shape, size, and volume.

As previously mentioned and as shown in the cross-section of FIG. 4, the lattice structure 362 differs from the lattice structure 162 of the cage 146 of FIG. 3. A cross-sectional area 432 of the lattice structure 362 extends at an angle from the inside surface 414 of the inner wall 360 toward the inside surface 410 of the outer wall 356. As shown in the dashed lines of FIG. 4, the three-dimensional lattice structure 362 includes a first edge 436 and a second edge 440 extending through the interior portion 372 of the cylindrical body 352. The first edge 436 is disposed on a reference plane P parallel or substantially parallel to the first ring 364 of the cylindrical body 352. The second edge 440 is non-parallel to the first edge 436 and corresponds to a generally zig-zag outline of the cylindrical body 352 formed by the first areas 388 of the plurality of passages 376. In the illustrated example, a first portion 444 of the second edge 440 is parallel or substantially parallel to the first edge 436 at an area between two of the plurality of passages 376. A second portion 448 of the second edge 440 is non-parallel to the first edge 436 and is disposed above the first area 388 (relatively in FIG. 4) of the passage 376.

The three-dimensional lattice structure 362 is disposed between the first ring 364 and at least one of the first and second non-parallel walls 402, 404 bordering the first area 388 of the passage 376. The passage 376, which is identical or substantially similar to the other passages 376, includes the first area 388, a second area 392, and a middle portion 394. Unlike the three-dimensional lattice structure 162 of FIG. 3, a width $W_V$ defined between the first and second side walls 402, 404 is smallest at a top point 396 of the first area 388 of the passage 376, and is widest adjacent the middle portion 394 of the passage 376. The first and second side walls 402, 404 define the first area 388 of the passage 376 over a distance $D_1$ and initially extending outwardly at an angle from the top point 396 of the passage 376 until the width $W_V$ reaches a first area width $W_1$, in which the first and second side walls 402, 404 are parallel or substantially parallel relative to each other. The first and second side walls 402, 404 abruptly slope or curve inwardly relative to the passage 376 over a distance $D_M$ such that the width $W_V$ of the passage 376 decreases from the first area width $W_1$ to a second area width $W_2$. The second area 392 of the passage 376, which is similar in shape as the second area 192 of the passage 176 of the second exemplary cage 146, is defined by the first and second side walls 402, 404 extending parallel or substantially parallel over a distance $D_2$ to the end wall 398.

The lattice structure 362 within the interior portion 372 of the cylindrical body 352 provides angled edges and sides such that the lattice structure 362 is formed to extend radially outwardly relative to a longitudinal axis A, as shown in the cross-sectional view, and to taper in the axial direction around the first areas 388 of the passages, as shown in the dashed lines. In another example, the lattice structure 362 may slope radially outwardly, axially, or may not slope within the interior portion 372. The manufacturing of the lattice structure 362 can be achieved using additive manufacturing techniques, which will be described in more detail below.

Figure 5:
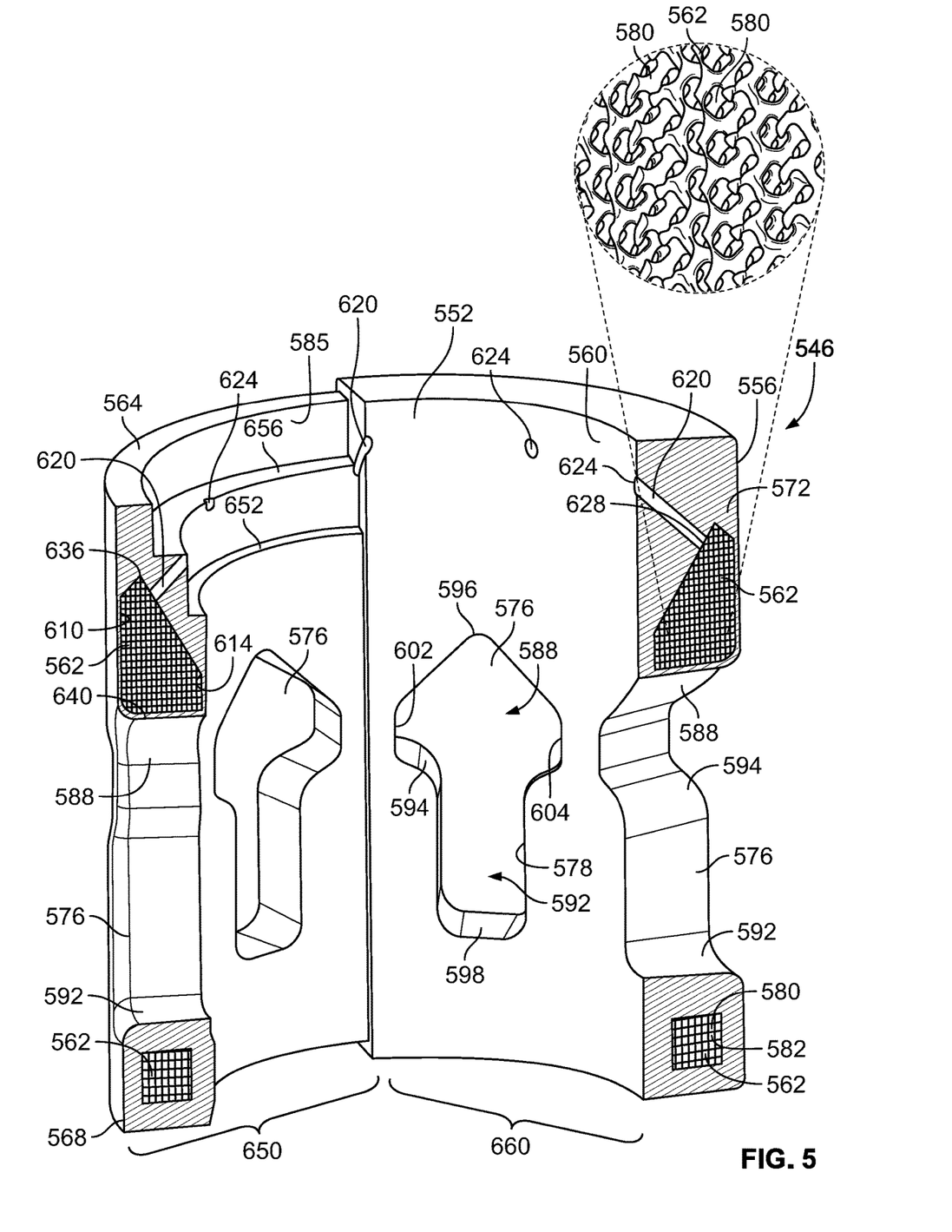
FIG. 5 is a cross-sectional perspective view of a valve cage assembled in accordance with the teachings of a fourth exemplary arrangement of the present disclosure and showing a partial cutaway of the valve cage.

Turning to FIG. 5, a fourth exemplary valve cage 546 is constructed according to the teachings of the present disclosure. The fourth exemplary cage 546 is similar to the third exemplary cage 346 of FIG. 4, thus, for ease of reference, and to the extent possible, the same or similar components of the fourth exemplary cage 546 will retain the same reference numbers as outlined above with respect to the third exemplary cage 346, although the reference numbers will be increased by 200.

Unlike the third exemplary valve cage 346, the fourth exemplary valve cage 546 includes a three-dimensional lattice structure 562 adjacent to both a first area 588 and a second area 592 of a plurality of passages 576. Additionally, a first portion 650 of a cylindrical body 552 of the cage 546 is shaped to include finishing features for adapting the valve cage 546 for use with a valve assembly 10. The first portion 650 includes an annular stepped portion 585 adjacent a first ring 564 of the cylindrical body 552 including a first step 652 and a second step 656, each recessed from an inner circumference of an inner wall 560 of the cylindrical body 552. The first portion 650 provides a mating surface to engage a bonnet, such as the bonnet 84 of FIG. 1, and/or to receive a bonnet seal. Additionally, a channel 620 extending at least partially through the cylindrical body 552 is sealed (e.g., welded, plugged) such that the lattice structure 562 is sealed from the surrounding environment. By comparison to a second portion 660, which may be unfinished, a circumference of the inner wall 560 of the first portion 650 is radially recessed relative to a circumference of the inner wall 560 of the second portion 660 of the cylindrical body 552. The second portion 660 is a rough stock version of the valve cage 546 such that the valve cage 546 is not yet ready for use within a valve assembly. However, in other examples, the second portion 660 of the cage 546 may be different from the first portion 650 to provide a particular guiding or sealing surface for engaging a particular control element.

The lattice structure 562 of the fourth exemplary valve cage 546 of FIG. 5 differs from the lattice structure 362 of the third exemplary valve cage 346 of FIG. 4. As shown in the magnified portion of the lattice structure 562 in FIG. 5, a plurality of lattice members 580 are arranged and connected to form a gyroid type lattice structure 562 having round openings 582. Additionally, the lattice members or struts 580 are thicker and, therefore, a volume fraction of the lattice structure 562 of the fourth exemplary valve cage 546 of FIG. 5 is greater than a volume fraction of the lattice structure 362 of the third exemplary valve cage 346 of FIG. 4. In other examples, the gyroid lattice structure 562 of the valve cage 546 may be customized to provide a particular geometry and formation, and may include a different pore size, strut thickness, and lattice volume fraction.

Figure 6:
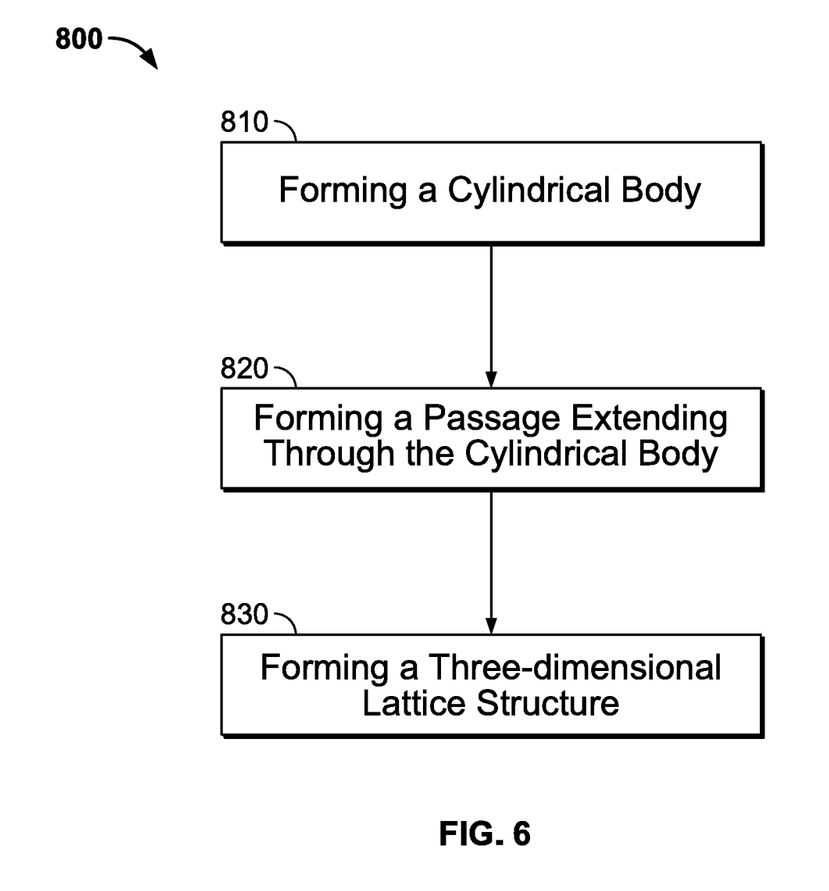
FIG. 6 is a schematic of an example process or method of manufacturing a valve cage in accordance with the teachings of the present disclosure.

Any one of the first, second, third, and fourth valve cages 46, 146, 346, and 546 may be manufactured according to a method or process 800 in FIG. 6 according to the teachings of the present disclosure. The valve cage 346 of FIG. 4 will be used in the following description of the method or process 800 to help illustrate each of the method steps. However, it will be appreciated that the method or process 800 is not limited to forming the third exemplary valve cage 346, and may be used to manufacture any of the illustrated examples described herein.

The method or process 800 of FIG. 6 involves manufacturing a valve cage 346 having a reduced weight. The method 800 includes an act 810 of forming a cylindrical body 352 having a first ring 364, a second ring 368 opposite the first ring 364, an outer wall 356, an inner wall 360 arranged to receive a valve element 42, and an interior portion 372 extending radially between the inner wall 360 and the outer wall 356 and extending longitudinally (i.e., axially) between the first ring 364 and the second ring 368. In a second step 820, the method 800 includes forming a passage 376 disposed between the first ring 364 and the second ring 368 and extending through the interior portion 372 of the cylindrical body 352. In a third step 830, the method 800 includes forming a three-dimensional lattice structure 362 and disposing the lattice structure 362 within the interior portion 372 of the cylindrical body 352.

The acts 810, 820, 830 may be formed together to create a unitary valve cage 346 using an AM technique or process that builds three-dimensional objects by adding successive layers of material on a receiving surface or material. The AM technique may be performed by any suitable machine or combination of machines. The AM technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-uponlayer fashion to fabricate a three-dimensional object. The AM technique may include any of several techniques or processes, such as, for example, a stereolithography ("SLA") process, digital light processing ("DLP"), a fused deposition modeling ("FDM") process, multi-jet modeling ("MJM") process, a selective laser sintering ("SLS") process, a selective laser melting ("SLM") process, an electronic beam melting ("EBM") process, and an arc welding AM process. In some examples, the AM process may include a directed energy laser deposition process. Such a directed energy laser deposition process may be performed by a multi-axis computer-numerically-controlled ("CNC") lathe with directed energy laser deposition capabilities. Other manufacturing techniques may be utilized to create a valve cage according to the present disclosure, and are not limited to the listed techniques herein.

Additionally, the example method 800 may be performed using other manufacturing processes and techniques outside of the AM technical field, such as, for example, investment casting. Using AM or other techniques, the steps 810, 820, and 830 may be performed at the same, different, or overlapping times. In one example, the valve cage 346 is formed layer by layer such that steps 810, 820, and 830. In another example, the cylindrical body 352 may be formed having a hollow interior portion 372, and the three-dimensional lattice structure 362 may be formed separately and then attached to the cylindrical body 352 by securing the lattice structure 362 to inside surfaces 410, 414 of the outer and inner walls 356, 360.

Further, step 830 may include depositing a solidifiable material to custom manufacture and design a lattice structure 362 having a reduced weight and for a particular application. This step 830 may include designing and forming a lattice structure 362 that best distributes force and to withstand highly pressurized fluid flow through the valve 10. For example, the lattice structure 362 may provide strength where needed by decreasing the distance between lattice members 380 (i.e., increasing lattice density) and may reduce weight of the cylindrical body 352 where strength is not needed by increasing the distance between lattice members 380 (i.e., decreasing lattice density). In another example, the lattice structure 362 may be designed to fill irregular shaped spaces of the interior portion 372 of the cage 356 that have been identified as areas that may be subject to weight reduction.

The step 810 of forming the cylindrical body 352 includes forming the cylindrical body 352 and the three-dimensional lattice structure 362 together by depositing a solidifiable material in multiple layers according to a predetermined pattern to form a three-dimensional integrated cage 346. Forming the cylindrical body 352 also includes forming a channel 420 extending from the inner wall 360 of the cylindrical body 352 to the interior portion 372 of the cylindrical body 352. After the AM process steps are completed, a step includes funneling loose and unused solidifiable material powder that is disposed in the interior portion 372 of the cylindrical body 352 out through the channel 420.

The method 800 includes analyzing the cage design to determine ways to shift/remove mass in localized areas in the valve cage 346 to retain structural integrity of the cylindrical body 352 while reducing the mass of the cage 346. The areas of the cage 346 that may be subject to weight reduction depend on the dynamics of media through the cage 346 and the design requirements of the cage 346 for a certain process system. To determine areas that are not subject to high stress, or that may afford a decrease in density and/or weight, topology optimization may be utilized for each cage design. Topology optimization, which is a method that optimizes material design for a given set of loads and boundary conditions and constraints, can maximize performance of a cage within a valve assembly. In other words, when designing a cage 346 manufactured by AM to reduce weight, topology optimization may help determine the geometric properties and spatial relationships between components of the cage 346 that are most important for performance. To provide an optimal design for a valve cage 346, cage features including, for example, axial strength of the cage 346, flow profile, passage arrangement, cooperative surfaces with a control element, and areas of high stress may be considered. Topology optimization may also determine what areas of the cage 346 are unaffected by continuous change of shape or size of the valve cage 346.

To identify the areas in which a lattice structure 362 may be incorporated, the method 800 may include establishing a stress threshold of the cylindrical body 352 and determining a localized area of the cylindrical body 352 that falls below the stress threshold. Topology optimization may include, for example, creating a set of boundaries for loads and stress imparted on a valve cage 346, and running a simulation based on design considerations such as, for example, pressure, temperature, loading conditions, etc. By analyzing the results of the simulation, an amount of mass that may be removed from the cage 346 without crossing the factor of safety threshold (e.g., stress threshold) can be evaluated. For example, a localized area of the cylindrical body 352 that falls below a predetermined stress threshold is in the interior portion 372 of the cylindrical body 352 between the first ring 364 and a first area 388 of the passage 376, and between the second ring 368 and a second area 392 of the passage 372. Once this area has been identified, the cylindrical body 352 and the lattice structure 362 may be formed in steps 820 and 830 by depositing a solidifiable material in the localized area.

Topology optimization may be used to determine an axial strength of a valve cage 346 and passage arrangement 376 of the valve cage 346 to achieve a particular flow profile. The method may include establishing a flow profile, and determining a shape of the passage, number of passages, space separating the passages, and other criteria to achieve the established flow profile. This step 820 may include depositing a solidifiable material in consecutive layers to form first and second side walls 402, 404 to define an arrow-shaped opening 378, for example, for each of the plurality of passages 376. In particular, the method may include arranging the solidifiable material so that a width $W_V$ of the passage 376 changes in an axial direction. The illustrated example provides a particular passage design opening 378 which may be shaped for a particular process condition and/or to achieve a particular flow characteristic of the media through the cage 346. According to the teachings of the present disclosure, other examples of passages 376 of the cage 346 may be shaped differently for particular process conditions and/or to attenuate noise.

Finally, the step 830 of forming the lattice structure 362 may include determining whether a gradient density of the lattice structure 362 would be desirable. For example, an area of the cage 356 between the top ring 364 and the top point 396 of the passage 376 may be subject to less internal pressure and/or dynamic forces than a portion of the cage 346 between the second ring 368 and the end wall 396 of the passage 376. Thus, areas of the cylindrical body 352 adjacent to the first area 388 and the second area 392 of the passage 376 may be subject to a reduced weight but are subject to different internal stress, the density and the pattern 382 of the lattice structure 362 may be different in these areas. In one example, the cylindrical body 352 adjacent to the first area 388 may be manufactured so that the density of the lattice structure 362 may either increase or decrease in an axial direction from a localized area adjacent the top point 396 of the passage 376 toward the first ring 364. In yet another example, the localized areas may include a lattice structure 362 having a high lattice density around the opening 378 of the passage 376 and a lower lattice density as the lattice structure 362 extends away from the opening 378 and in toward a localized area between passages 376.

Apart from constructing density gradients, AM techniques may also afford the valve cage 346 to be customizable to achieve certain flow characteristics, strength properties, or other desired traits to improve performance of fluid regulator or control valve. The method may include performing finite element analysis ("FEA") to determine structural requirements or desired characteristics of the valve cage 346 that may be customized using AM. For example, the passage arrangement 376 may be constructed to provide an equal percentage, linear, and quick opening valve cage. In another example, the lattice structure 362 may be constructed such that the lattice members 380 are connected and arranged to better transfer load and other forces imparted on the valve cage 346 to increase the strength of the cage 346. Finally, the lattice structure 386 may be customized to achieve a desired weight and strength of the valve cage 346.

The figures and description provided herein depict and describe preferred examples of a valve assembly having a cage for purposes of illustration only. One skilled in the art will readily recognize from the foregoing discussion that alternative variants of the components illustrated herein may be employed without departing from the principles described herein. Thus, upon reading this disclosure, those of skill in the art will appreciate still additional alternative structural and functional designs for cages for control valves. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A method of manufacturing a body of a valve cage using additive manufacturing, the method comprising:
    forming a cylindrical body having a first ring, a second ring opposite the first ring, an outer wall, an inner wall arranged to receive a valve element, and an interior portion extending radially between the inner wall and the outer wall and extending longitudinally between the first ring and the second ring;
    forming first and second passages disposed between the first ring and the second ring and extending through the inner and outer walls of the cylindrical body, the second passage spaced circumferentially relative to the first passage;
    forming a three-dimensional lattice structure and disposing the three-dimensional lattice structure in the interior portion of the cylindrical body, at least a portion of the three-dimensional lattice structure disposed between the first passage and the second passage.

2. The method of claim 1, wherein forming the three-dimensional lattice structure includes depositing a solidifiable material within the interior portion in at least one of a first area proximate to the first ring and a second area proximate to the second ring.

3. The method of claim 1, further comprising:
    establishing a stress threshold of the cylindrical body;
    determining a localized area of the cylindrical body that falls below the stress threshold; and
    wherein forming the three-dimensional lattice structure includes depositing a solidifiable material in the localized area.

4. The method of claim 3, further comprising:
    establishing a flow profile of the first passage;
    determining a shape of the first passage to achieve the flow profile; and
    wherein forming the first passage includes depositing a solidifiable material in multiple layers to form the shape of the first passage.

5. The method of claim 1, further comprising:
    forming a channel extending from the inner wall of the cylindrical body to the interior portion of the cylindrical body; and
    funneling loose solidifiable material disposed in the interior portion of the cylindrical body through the channel.

6. The method of claim 1, wherein forming the first passage includes depositing a solidifiable material in consecutive layers to form first and second side walls defining the first passage and arranging the solidifiable material so that a width of the first passage defined between the first and second side walls decreases in an axial direction.

7. The method of claim 1, wherein forming the cylindrical body includes forming the cylindrical body and the three-dimensional lattice structure together by depositing a solidifiable material in multiple layers according to a predetermined pattern to form a three-dimensional integrated cage.

8. A valve cage for a control valve, the valve cage comprising:
    a cylindrical body including a first ring, a second ring opposite the first ring, an outer wall, an inner wall, and an interior portion that extends radially between the inner wall and the outer wall and extends axially between the first ring and the second ring, the cylindrical body arranged to be positioned between an inlet and an outlet of a valve body and arranged to receive a control element;
    a passage extending through the outer and inner walls of the cylindrical body, the passage disposed between the first ring and the second ring of the cylindrical body, the passage including a first area proximally located to the first ring and a second area proximally located to the second ring, first area being defined by first and second non-parallel walls;
    a three-dimensional lattice structure disposed in the interior portion of the cylindrical body and adjacent to the first area of the passage and between the first ring and at least one of the first and second non-parallel walls, the three-dimensional lattice structure having a cross-sectional area that tapers from at least one of the first and second non-parallel walls toward the first ring of the cylindrical body; and
    wherein the first and second non-parallel walls are angled such that a width of the first area of the passage is defined between the first and second non-parallel walls and the width of the passage decreases in an axial direction.

9. A valve cage for a control valve, the valve cage comprising:
    a cylindrical body including a first ring, a second ring opposite the first ring, an outer wall, an inner wall, and an interior portion that extends radially between the inner wall and the outer wall and extends axially between the first ring and the second ring, the cylindrical body arranged to be positioned between an inlet and an outlet of a valve body and arranged to receive a control element;

a first passage extending through the outer and inner walls of the cylindrical body, the first passage disposed between the first ring and the second ring of the cylindrical body;

a second passage extending through the outer and inner walls of the cylindrical body, the second passage disposed between the first ring and the second ring and spaced circumferentially relative to the first passage; and a three-dimensional lattice structure disposed in the interior portion of the cylindrical body and is fluidly isolated from the first passage and the second passage; and wherein the three-dimensional lattice structure is at least partially disposed between the first passage and the second passage.

10. The valve cage of claim 9, wherein the three-dimensional lattice structure extends between an inside surface of the inner wall and an inside surface of the outer wall.

11. The valve cage of claim 10, wherein the three-dimensional lattice structure extends at an angle between the inside surface of the inner wall and the inside surface of the outer wall.

12. The valve cage of claim 9, wherein the first passage includes a first area proximally located to the first ring and a second area proximally located to the second ring, the three-dimensional lattice structure disposed in the interior portion adjacent to the first area of the first passage.

13. The valve cage of claim 12, wherein the first area that is proximally located to the first ring is defined by first and second non-parallel walls, and the three-dimensional lattice structure is disposed between the first ring and at least one of the first and second non-parallel walls.

14. The valve cage of claim 13, wherein the first and second non-parallel walls are angled such that a width of the first area of the first passage is defined between the first and second non-parallel walls and the width of the first passage decreases in an axial direction.

15. The valve cage of claim 14, wherein the three-dimensional lattice structure has a cross-sectional area that tapers from at least one of the first and second non-parallel walls toward the first ring of the cylindrical body.

16. The valve cage of claim 13, wherein the three-dimensional lattice structure includes a first outer edge and a second outer edge, the first outer edge disposed on a reference plane substantially parallel to the first ring of the cylindrical body, a portion of the second outer edge being non-parallel to the first outer edge.

17. The valve cage of claim 16, wherein the second outer edge has a first portion parallel to the first outer edge and a second portion non-parallel to the first outer edge, the second portion of the second outer edge being disposed above the first area of the first passage.

18. A valve assembly comprising:
a valve body defining an inlet, an outlet, and a fluid flow path connecting the inlet and the outlet;
a valve seat positioned in the fluid flow path between the inlet and the outlet;
a valve stem disposed in the valve body;
a control element operatively connected to the valve stem and disposed in the fluid flow path, the control element movable between a closed position, in which the control element engages the valve seat, and an open position, in which the control element is spaced away from the valve seat; and
a valve cage disposed in the valve body adjacent the valve seat, the valve cage comprising:
a cylindrical body having an outer wall and an inner wall that is sized to receive the control element, the cylindrical body including a first ring, a second ring opposite the first ring, and an interior portion that extends radially between the inner wall and the outer wall and extends axially between the first ring and the second ring;
a first passage extending through the outer and inner walls of the cylindrical body, the first passage disposed between the first ring and the second ring of the cylindrical body;
a second passage extending through the outer and inner walls of the cylindrical body, the second passage disposed between the first ring and the second ring and spaced circumferentially relative to the first passage; and
a three-dimensional lattice structure disposed in the interior portion of the cylindrical body; and
wherein the three-dimensional lattice structure is fluidly isolated from the fluid flow path and is at least partially disposed between the first passage and the second passage.

19. The valve assembly of claim 18, wherein the three-dimensional lattice structure extends around the inner wall of the cylindrical body.

20. The valve assembly of claim 18, wherein the first passage includes a first area proximally located to the first ring and a second area proximally located to the second ring, the three-dimensional lattice structure disposed in the interior portion adjacent to at least one of the first area of the first passage and the second area of the first passage.

* * * * *

UNITED STATES PATENT AND TRADEMARK OFFICE
CERTIFICATE OF CORRECTION

| | |
|---|---|
| PATENT NO. | : 11,079,031 B2 |
| APPLICATION NO. | : 15/982684 |
| DATED | : August 3, 2021 |
| INVENTOR(S) | : Thomas N. Gabriel |

It is certified that error appears in the above-identified patent and that said Letters Patent is hereby corrected as shown below:

In the Specification

At Column 1, Line 52, "ay" should be -- may --.

At Column 4, Line 2, "body 14" should be -- valve body 14 --.

At Column 5, Line 8, "seat 30 to secure the seat 30" should be -- valve seat 30 to secure the valve seat 30 --.

At Column 5, Line 57, "may" should be -- may be --.

At Column 7, Line 6 "passaged" should be -- passage --.

At Column 7, Line 9, "inner wall 156" should be -- outer wall 156 --.

At Column 7, Line 29, "positioned a" should be -- positioned at a --.

At Column 8, Line 35, "though" should be -- through --.

At Column 8, Line 52, "due" should be -- due to --.

At Column 11, Line 34, "to withstand" should be -- withstands --.

At Column 11, Line 35, "valve 10." should be -- valve assembly 10. --.

At Column 11, Line 44, "cage 356" should be -- cage 346 --.

At Column 12, Line 32, "passage 372." should be -- passage 376. --.

Signed and Sealed this
Third Day of September, 2024

Katherine Kelly Vidal
*Director of the United States Patent and Trademark Office*

At Column 12, Line 60, "cage 356" should be -- cage 346 --.

At Column 12, Line 63, "end wall 396" should be -- end wall 398 --.